US012756407B2

(12) United States Patent
Tsai et al.

(10) Patent No.: US 12,756,407 B2
(45) Date of Patent: Oct. 6, 2026

(54) WIRELESS COMMUNICATION DEVICE FOR CONCURRENTLY RECEIVING MULTIPLE TYPES OF SIGNALS AND ASSOCIATED METHOD

(71) Applicant: Realtek Semiconductor Corp., HsinChu (TW)

(72) Inventors: Ping-Hsuan Tsai, HsinChu (TW); Kuan-Yu Shih, HsinChu (TW); Chia-Jun Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 261 days.

(21) Appl. No.: 18/766,687

(22) Filed: Jul. 9, 2024

(65) Prior Publication Data

US 2025/0023585 A1 Jan. 16, 2025

(30) Foreign Application Priority Data

Jul. 11, 2023 (TW) ................................ 112125860

(51) Int. Cl.
*H04B 1/00* (2006.01)
*H04B 1/10* (2006.01)
*H04W 88/06* (2009.01)

(52) U.S. Cl.
CPC ........... *H04B 1/0057* (2013.01); *H04B 1/109* (2013.01); *H04W 88/06* (2013.01)

(58) Field of Classification Search
CPC ...... H04B 1/0057; H04B 1/109; H04W 88/06
See application file for complete search history.

(56) References Cited

U.S. PATENT DOCUMENTS

| | | | | |
|---|---|---|---|---|
| 8,755,756 | B1 * | 6/2014 | Zhang .................... | H04B 1/109 455/114.2 |
| 2016/0234797 | A1 * | 8/2016 | Park ...................... | H04J 3/0685 |
| 2024/0372642 | A1 * | 11/2024 | Venkatachari ......... | H04B 1/525 |
| 2025/0038771 | A1 * | 1/2025 | Kunardi ............... | H04B 1/0057 |

* cited by examiner

*Primary Examiner* — Hashim S Bhatti
(74) *Attorney, Agent, or Firm* — Winston Hsu

(57) ABSTRACT

A wireless communication device for concurrently receiving multiple types of signals and associated methods are provided. The wireless communication device includes at least one low noise amplifier (LNA), a first conversion circuit, a second conversion circuit, a first filter and a second filter. The at least one LNA amplifies an initial signal received by an antenna to generate at least one input signal, wherein the first conversion circuit and the second conversion circuit perform conversion operations according to the at least one input signal to generate a first converted signal and a second converted signal, respectively. More particularly, the first filter performs a filtering operation corresponding to a first-type signal upon the first converted signal, and the second filter performs a filtering operation corresponding to a second-type signal upon the second converted signal.

17 Claims, 6 Drawing Sheets

WIRELESS COMMUNICATION DEVICE FOR CONCURRENTLY RECEIVING MULTIPLE TYPES OF SIGNALS AND ASSOCIATED METHOD

BACKGROUND OF THE INVENTION

1. Field of the Invention

The present invention is related to receiving control of wireless communication devices and more particularly, to a wireless communication device for concurrently receiving multiple types of signals, and an associated method.

2. Description of the Prior Art

In a radio frequency (RF) receiver, a Bluetooth signal receiving path and a wireless local area network (WLAN) signal receiving path may share some components such as an antenna and a low noise amplifier (LNA). When performing certain signal processing (e.g. filtering) on a node of the shared component, associated settings are hard to be optimized for Bluetooth signals and WLAN signals at the same time. For example, when the RF receiver concurrently receive a Bluetooth signal and a WLAN signal, if the node of the shared component mentioned above is optimized for filtering one of the Bluetooth signal and the WLAN signal, this filtering operation will result in attenuation to power of the other signal.

Thus, there is a need for a novel receiver architecture and an associated method, which can guarantee a receiving performance of both a Bluetooth signal and a WLAN signal under a shared antenna architecture.

SUMMARY OF THE INVENTION

An objective of the present invention is to provide a wireless communication device for concurrently receiving multiple types of signals, and an associated method, in order to solve the problem of failing to satisfy receiving performances of both Bluetooth signals and wireless local area network (WLAN) signals.

At least one embodiment of the present invention provides a wireless communication device for concurrently receiving multiple types of signals. The wireless communication device comprises at least one pre-stage low noise amplifier (LNA), a first conversion circuit, a second conversion circuit, a first filter and a second filter, where the at least one pre-stage LNA is coupled to an antenna, and the first filter and the second filter are coupled to the first conversion circuit and the second conversion circuit, respectively. The at least one pre-stage LNA is configured to amplify an initial signal received by the antenna to generate at least one input signal, where the initial signal comprises the multiple types of signals, and the multiple types of signals comprise a first-type signal and a second-type signal. The first conversion circuit is configured to perform a conversion operation upon the at least one input signal to generate a first converted signal, and the second conversion circuit is configured to perform the conversion operation upon the at least one input signal to generate a second converted signal. The first filter is configured to filter the first converted signal to reduce powers of signals other than the first-type signal among the first converted signal, in order to make a first receiving path coupled to the first filter process the first-type signal within the first converted signal. The second filter is configured to filter the second converted signal to reduce powers of signals other than the second-type signal among the second converted signal, in order to make a second receiving path coupled to the second filter process the second-type signal within the second converted signal.

At least one embodiment of the present invention provides a method for concurrently receiving multiple types of signals in a wireless communication device. The method comprises: utilizing at least one pre-stage LNA of the wireless communication device to amplify an initial signal received by an antenna to generate at least one input signal, wherein the initial signal comprises the multiple types of signals, and the multiple types of signals comprise a first-type signal and a second-type signal; utilizing a first conversion circuit of the wireless communication device to perform a conversion operation upon the at least one input signal to generate a first converted signal; utilizing a second conversion circuit of the wireless communication device to perform the conversion operation upon the at least one input signal to generate a second converted signal; utilizing a first filter of the wireless communication device to filter the first converted signal to reduce powers of signals other than the first-type signal among the first converted signal, in order to make a first receiving path coupled to the first filter process the first-type signal within the first converted signal; and utilizing a second filter of the wireless communication device to filter the second converted signal to reduce powers of signals other than the second-type signal among the second converted signal, in order to make a second receiving path coupled to the second filter process the second-type signal within the second converted signal.

At least one embodiment of the present invention provides a method for concurrently receiving multiple types of signals in a wireless communication device. The method comprises: utilizing a pre-stage LNA of the wireless communication device to amplify an initial signal received by an antenna to generate an input signal, wherein the initial signal comprises the multiple types of signals, and the multiple types of signals comprise a first-type signal and a second-type signal; utilizing a conversion circuit of the wireless communication device to perform a conversion operation upon the input signal to generate a converted signal; and controlling a configuration of a filter coupled to the conversion circuit according to an enablement state of a function of receiving the first-type signal or the second-type signal, wherein the filter is configured to filter the converted signal to reduce powers of signals other than either of the first-type signal and the second-type signal among the converted signal.

The wireless communication device and the method provided by the embodiment of the present invention can configure multiple signal paths in a backend of the antenna, where filters on respective paths are optimized for different types of signals (e.g. the Bluetooth signals and the WLAN signals), respectively. Thus, each of these different types of signals can be properly transmitted to respective backend receiving paths without interfered by the filter on the other path. In addition, the present invention can determine whether to enable the filter on a shared path according to an enablement state of a function of receiving a specific type of signal, in order to prevent the filter from disturbing the specific type of signal. Thus, the present invention can guarantee the receiving performances of different type of signals (e.g. the Bluetooth signals and the WLAN signals) under a shared antenna architecture.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
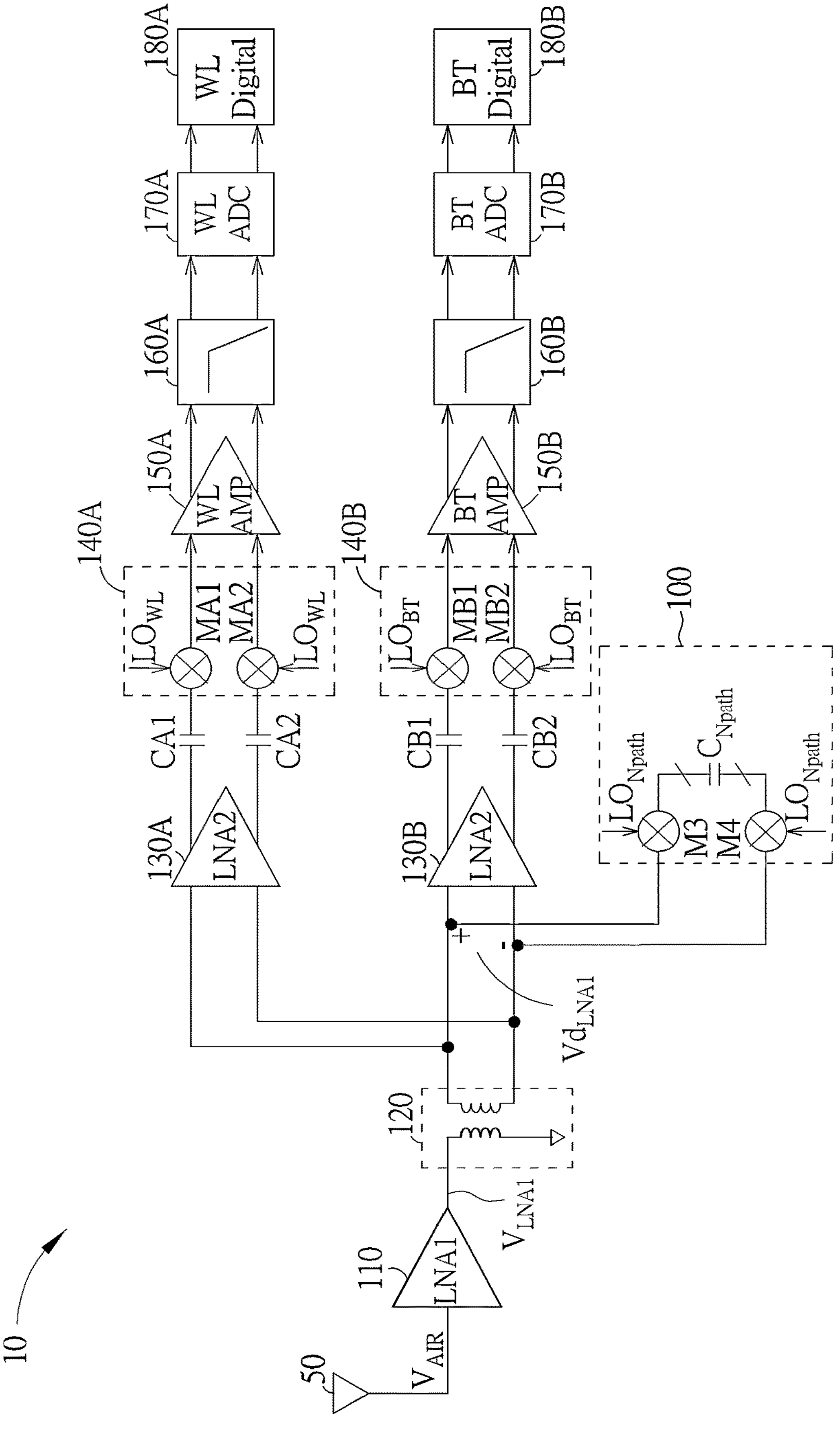
FIG. 1 is a diagram illustrating a wireless communication device according to an embodiment of the present invention.

FIG. 1 is a diagram illustrating a wireless communication device 10 according to an embodiment of the present invention, where the communication device 10 may be a receiver which is equipped with a function of concurrently receiving multiple types of signals such as Bluetooth signals and wireless local area network (WLAN) signals. In some embodiment, the wireless communication device 10 may be a portion of a transceiver (e.g. a receiver within the transceiver) which is equipped with the function of concurrently receiving the multiple types of signals (e.g. the Bluetooth signals and the WLAN signals), but the present invention is not limited thereto. As shown in FIG. 1, the wireless communication device 10 may comprise an antenna 50, a pre-stage low noise amplifier (LNA) 110 (labeled "LNA1" in figures for brevity), a conversion circuit such as a balanced to unbalanced (Balun) transformer 120, post-stage LNAs 130A and 130B (labeled "LNA2" in figures for brevity), a filter such as an N-path filter 100, an alternating current (AC)-coupled capacitors CA1, CA2, CB1 and CB2, down converters 140A and 140B, an amplifier 150A for amplifying the WLAN signals (labeled "WL AMP" in figures for brevity), an amplifier 150B for amplifying the Bluetooth signals (labeled "BT AMP" in figures for brevity), low pass filters 160A and 160B, an analog-to-digital converter (ADC) 170A for performing an analog-to-digital conversion upon the WLAN signals (labeled "WL ADC" in figures for brevity), an ADC 170B for performing the analog-to-digital conversion upon the Bluetooth signals (labeled "BT ADC" in figures for brevity), a digital circuit 180A for performing digital signal processing upon the WLAN signals (labeled "WL Digital" in figures for brevity), and a digital circuit 180B for performing digital signal processing upon the Bluetooth signals (labeled "BT Digital" in figures for brevity).

In this embodiment, the pre-stage LNA 110 is coupled to the antenna 50, and may be configured to amplify an initial signal $V_{AIR}$ received by the antenna 50 to generate an input signal $V_{LNA1}$, where the initial signal $V_{AIR}$ may comprise multiple types of signals such as a first-type signal (e.g. a WLAN signal) and a second type signal (e.g. a Bluetooth signal). Thus, the input signal $V_{LNA1}$ may comprise amplified results of the first-type signal and the second-type signal (which may be referred to as the WLAN signal and the Bluetooth signal among the input signal $V_{LNA1}$). The Balun transformer 120 is coupled to the pre-stage LNA 110, and may be configured to perform a conversion operation (e.g. a single-to-differential conversion) upon the input signal $V_{LNA1}$ to generate a converted signal $Vd_{LNA1}$. The N-path filter 100 is coupled to the Balun transformer 120, and is configured to filter (e.g. performing band pass filtering) the converted signal $Vd_{LNA1}$. In this embodiment, the N-path filter 100 may comprise at least one mixer (e.g. mixers M3 and M4) and a capacitor $C_{Npath}$, where the capacitor $C_{Npath}$ is coupled to the at least one mixer (e.g. coupled between the mixers M3 and M4). In this embodiment, the mixers M3 and M4 may drive the capacitor $C_{Npath}$ according to a frequency $LO_{Npath}$. For example, the mixers M3 and M4 may be regarded as equivalent resistors connected to the capacitor $C_{Npath}$, to thereby achieve a filtering effect. As the mixers M3 and M4 have the effects of up-conversion/down-conversion, the network formed by the mixers M3 and M4 and the capacitor $C_{Npath}$ may achieve a band pass filtering effect with a center frequency equal to the frequency $LO_{Npath}$ on the converted signal $Vd_{LNA1}$. In this embodiment, the WLAN signal is carried on a frequency $LO_{WL}$ and the Bluetooth signal is carried on a frequency $LO_{BT}$. Thus, when the frequency $LO_{Npath}$ is set to be $LO_{WL}$, the N-path filter 100 may reduce powers of signals other than the WLAN signal among the converted signal $Vd_{LNA1}$. When the frequency $LO_{Npath}$ is set to be $LO_{BT}$, the N-path filter 100 may reduce powers of signals other than the Bluetooth signal among the converted signal $Vd_{LNA1}$.

In this embodiment, the post-stage LNA 130A, the AC-coupled capacitors CA1 and CA2, the down converter 140A, the amplifier 150A, the low pass filter 160A, the ADC 170A and the digital circuit 180A may form a WLAN receiving path coupled to the Balun transformer 120 and the N-path filter 100, in order to process the WLAN signal among the converted signal $Vd_{LNA1}$. In addition, the post-stage LNA 130B, the AC-coupled capacitors CB1 and CB2, the down converter 140B, the amplifier 150B, the low pass filter 160B, the ADC 170B and the digital circuit 180B may form a Bluetooth receiving path coupled to the Balun transformer 120 and the N-path filter 100, in order to process the Bluetooth signal among the converted signal $Vd_{LNA1}$.

In this embodiment, the down converter 140A (e.g. mixers MA1 and MA2 therein) may perform a down conversion upon the WLAN signal among the converted signal $Vd_{LNA1}$ according to the frequency $LO_{WL}$, and the down converter 140B (e.g. mixers MB1 and MB2 therein) may perform the down conversion upon the Bluetooth signal among the converted signal $Vd_{LNA1}$ according to the frequency $LO_{BT}$. For example, the post-stage LNA 130A may amplify the WLAN signal among the converted signal $Vd_{LNA1}$ and transmit the amplified WLAN signal to the down converter 140A via the AC-coupled capacitors CA1 and CA2, in order to down convert the WLAN signal carried on the frequency $LO_{WL}$ to a baseband frequency. The post-stage LNA 130B may amplify the Bluetooth signal among the converted signal $Vd_{LNA1}$ and transmit the amplified Bluetooth signal to the down converter 140B via the AC-coupled capacitors CB1 and CB2, in order to down convert the Bluetooth signal carried on the frequency $LO_{BT}$ to the baseband frequency. Those skilled in this art should understand other operations in the WLAN receiving path and the Bluetooth receiving path (e.g. the amplifiers 150A and 150B, the low pass filters 160A and 160B, the ADCs 170A and 170B, and the digital circuits 180A and 180B) according to the above descriptions and the architecture shown in FIG. 1, and related details are omitted here for brevity.

Figure 2:
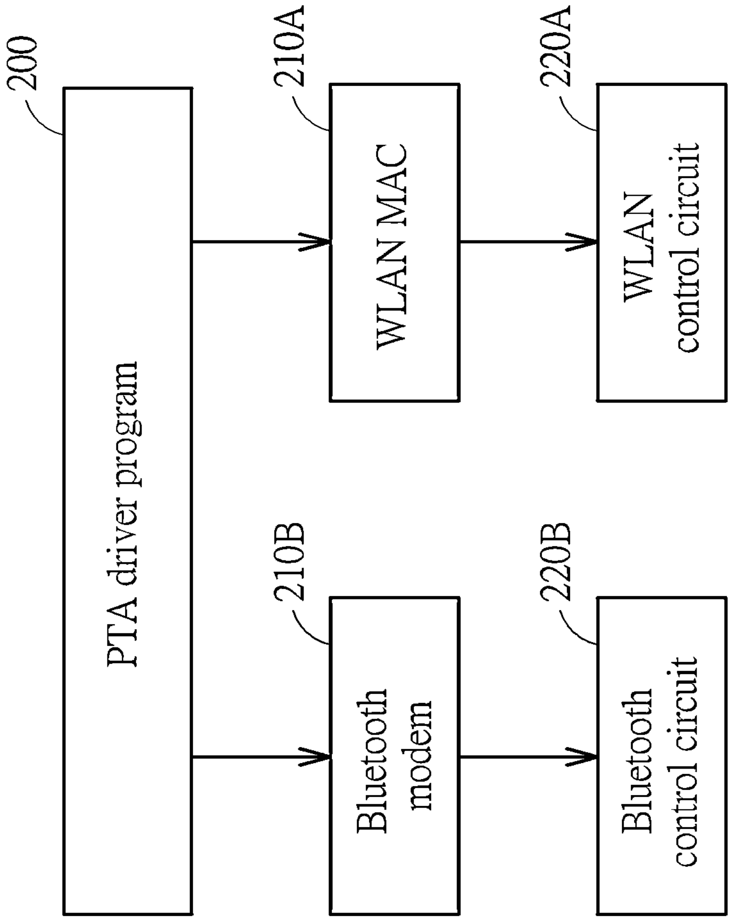
FIG. 2 is a diagram illustrating a control scheme of an electronic device which receives multiple types of signals according to an embodiment of the present invention.

FIG. 2 is a diagram illustrating a control scheme of an electronic device (e.g. that comprising the wireless communication device 10 shown in FIG. 1) which receives multiple types of signals (e.g. the WLAN signal and the Bluetooth signal) according to an embodiment of the present invention. In this embodiment, the electronic device may utilize a driver program such as a packet traffic arbitration (PTA) driver program 200 running thereon to determine whether a function of receiving the WLAN signal or receiving the Bluetooth signal is enabled, and accordingly control configurations of a WLAN control circuit 220A and a Bluetooth control circuit 220B via a WLAN media access control (MAC) layer 210A (labeled "WLAN MAC" in FIG. 2 for brevity) and a Bluetooth modulator-demodulator (modem) 210B, respectively. More particularly, the PTA driver program 200 may control the WLAN control circuit 220A and the Bluetooth control circuit 220B according to an enablement state of a receiving function of either of the WLAN signal and the Bluetooth signal, in order to selectively enable the N-path filter 100 shown in FIG. 1.

In some embodiments, the N-path filter 100 is configured to provide the band pass filtering effect by taking the frequency $LO_{WL}$ as the center frequency (e.g. $LO_{Npath}=LO_{WL}$). When the PTA driver program 200 determines that the function of receiving the WLAN signal is enabled and the function of receiving the Bluetooth signal is disabled in the electronic device, the N-path filter 100 may be enabled to optimize the WLAN signal received by the WLAN receiving path shown in FIG. 1. When the PTA driver program 200 determines that the functions of receiving the WLAN signal and the Bluetooth signal are both enabled in the electronic device, the N-path filter 100 may be disabled to prevent the Bluetooth signal received by the Bluetooth receiving path shown in FIG. 1 from being attenuated due to the N-path filter 100.

In some embodiments, the N-path filter 100 is configured to provide the band pass filtering effect by taking the frequency $LO_{BT}$ as the center frequency (e.g. $LO_{Npath}=LO_{BT}$). When the PTA driver program 200 determines that the function of receiving the Bluetooth signal is enabled and the function of receiving the WLAN signal is disabled in the electronic device, the N-path filter 100 may be enabled to optimize the Bluetooth signal received by the Bluetooth receiving path shown in FIG. 1. When the PTA driver program 200 determines that the functions of receiving the Bluetooth signal and the WLAN signal are both enabled in the electronic device, the N-path filter 100 may be disabled to prevent the WLAN signal received by the WLAN receiving path shown in FIG. 1 from being attenuated due to the N-path filter 100.

In some embodiments, the center frequency of the band pass filtering effect provided by the N-path filter 100 may be controlled by a switch circuit. For example, the switch circuit may select one of the frequencies $LO_{WL}$ and $LO_{BT}$ according to the enablement states of the function of receiving the Bluetooth signal and/or the function of receiving the WLAN signal in the electronic device, to be provided to the mixers M3 and M4 for settings of the center frequency, but the present invention is not limited thereto.

Figure 3:
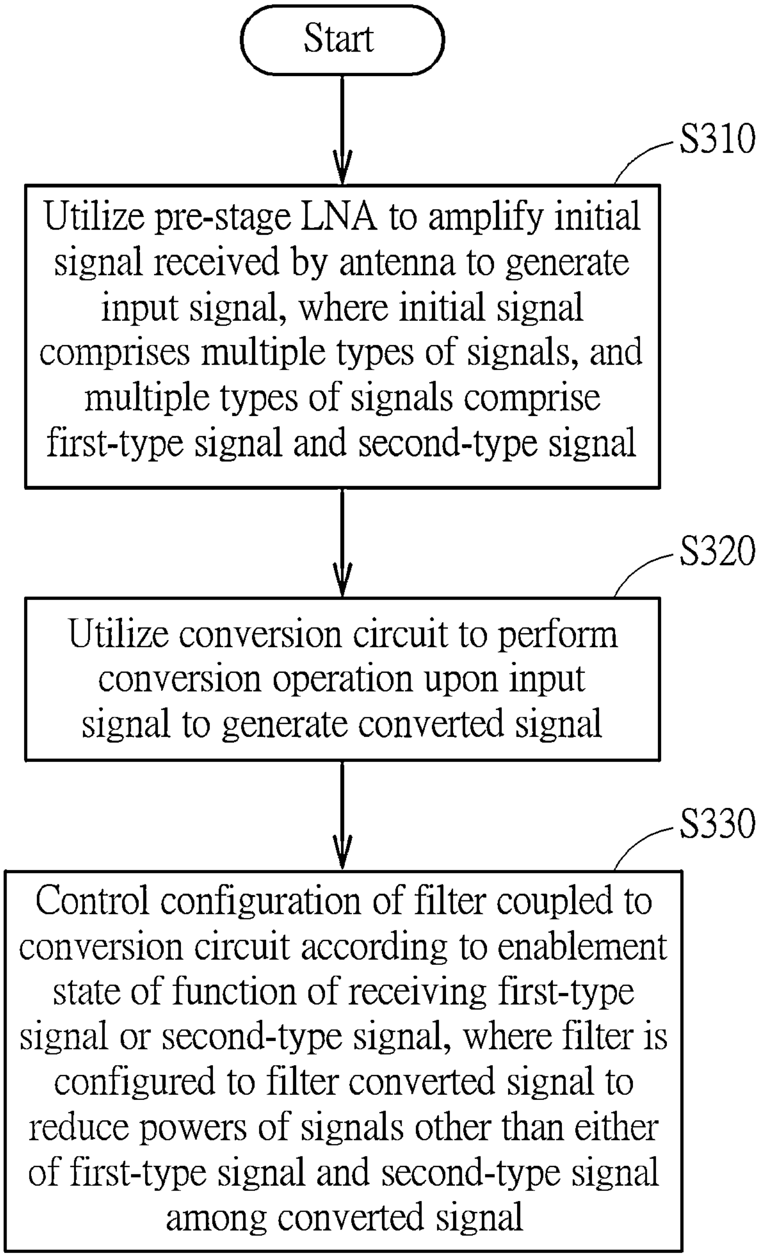
FIG. 3 is a diagram illustrating a working flow of a method for concurrently receiving multiple types of signals in a wireless communication device according to an embodiment of the present invention.

FIG. 3 is a diagram illustrating a working flow of a method for concurrently receiving multiple types of signals (e.g. the WLAN signal and the Bluetooth signal mentioned above) in a wireless communication device (e.g. the wireless communication device 10 shown in FIG. 1) according to an embodiment of the present invention. It should be noted that the working flow shown in FIG. 3 is for illustrative purposes only, and is not meant to be a limitation of the present invention. For example, one or more steps may be added, deleted or modified in the working flow shown in FIG. 3. In addition, if a same result can be obtained, these steps do not have to be executed in the exact order shown in FIG. 3.

In Step S310, the wireless communication device may utilize a pre-stage LNA therein to amplify an initial signal received by an antenna to generate an input signal, where the initial signal comprises the multiple types of signals, and the multiple types of signals comprise a first-type signal (e.g. the WLAN signal mentioned above) and a second-type signal (e.g. the Bluetooth signal mentioned above).

In Step S320, the wireless communication device may utilize a conversion circuit therein to perform a conversion operation upon the input signal to generate a converted signal.

In Step S330, an electronic device which comprises the wireless communication device may utilize a driver program (e.g. the PTA driver program 200 shown in FIG. 2) running thereon to control a configuration of a filter coupled to the conversion circuit according to an enablement state of a function of receiving the first-type signal or the second-type signal (e.g. the PTA driver program 200 may control the WLAN control circuit 220A and/or the Bluetooth control circuit 220B to send at least one enablement control signal to enable or disable the filter), where the filter is configured to filter the converted signal to reduce powers of signals other than either of the first-type signal and the second-type signal among the converted signal.

Figure 4:
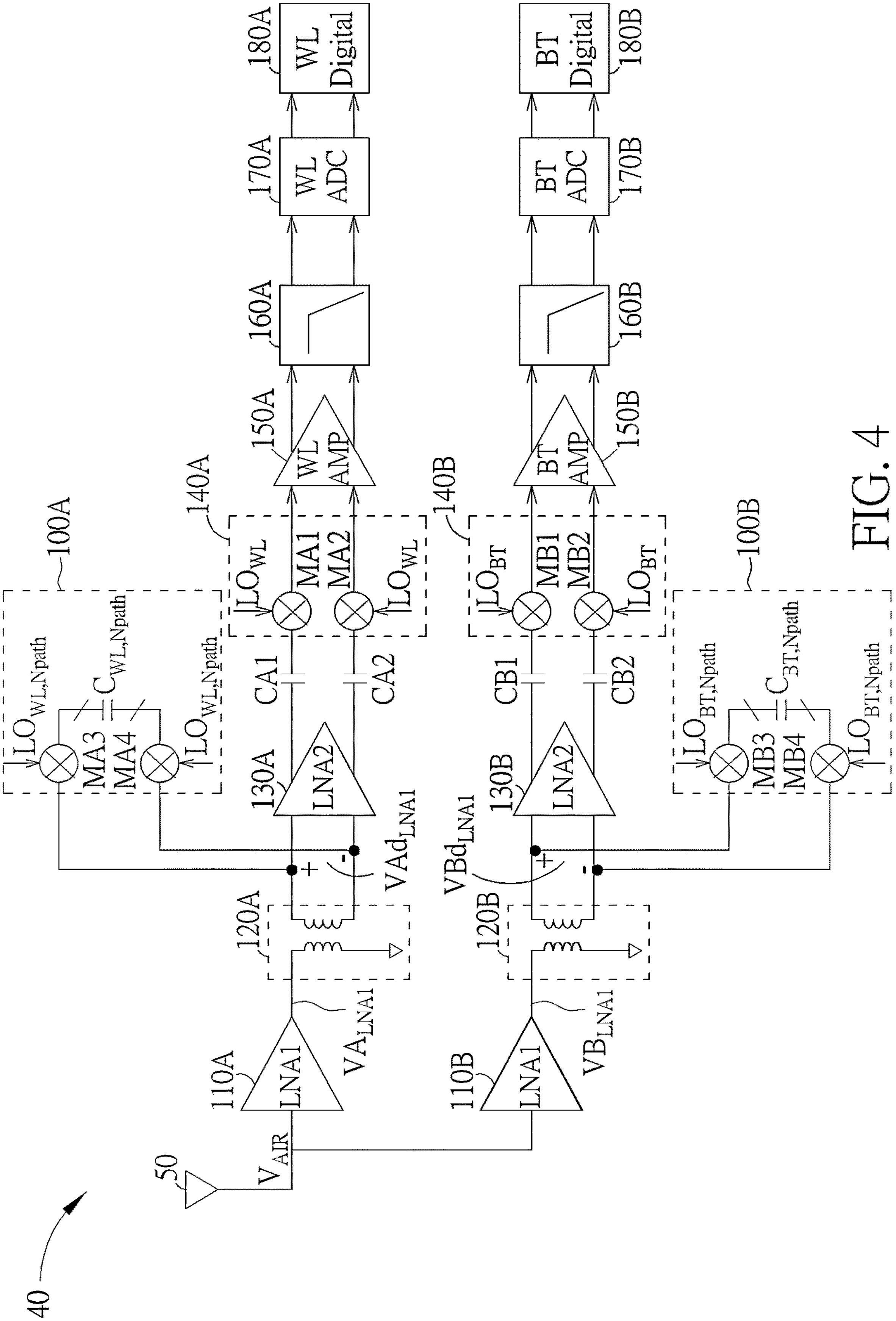
FIG. 4 is a diagram illustrating a wireless communication device according to another embodiment of the present invention.

FIG. 4 is a diagram illustrating a wireless communication device 40 according to another embodiment of the present invention, where the communication device 40 may be a receiver which is equipped with a function of concurrently receiving multiple types of signals such as Bluetooth signals and WLAN signals. In some embodiment, the wireless communication device 40 may be a portion of a transceiver (e.g. a receiver within the transceiver) which is equipped with the function of concurrently receiving the multiple types of signals (e.g. the Bluetooth signals and the WLAN signals), but the present invention is not limited thereto. As shown in FIG. 4, the wireless communication device 40 may comprise the antenna 50, pre-stage LNAs 110A and 110B (labeled "LNA1" in figures for brevity), conversion circuits such as Balun transformers 120A and 120B, the post-stage LNAs 130A and 130B, filters such as N-path filters 100A and 100B, the AC-coupled capacitors CA1, CA2, CB1 and CB2, the down converters 140A and 140B, the amplifier 150A for amplifying the WLAN signals (labeled "WL AMP" in figures for brevity), the amplifier 150B for amplifying the Bluetooth signals (labeled "BT AMP" in figures for brevity), the low pass filters 160A and 160B, the ADC 170A for performing the analog-to-digital conversion upon the WLAN signals (labeled "WL ADC" in figures for brevity), the ADC 170B for performing the analog-to-digital conversion upon the Bluetooth signals (labeled "BT ADC" in figures for brevity), the digital circuit 180A for performing digital signal processing upon the WLAN signals (labeled "WL Digital" in figures for brevity), and the digital circuit 180B for performing digital signal processing upon the Bluetooth signals (labeled "BT Digital" in figures for brevity).

In this embodiment, the pre-stage LNA 110A is coupled to the antenna 50, and may be configured to amplify the initial signal $V_{AIR}$ received by the antenna 50 to generate an input signal $VA_{LNA1}$. In addition, the pre-stage LNA 110B is coupled to the antenna 50, and may be configured to amplify the initial signal $V_{AIR}$ received by the antenna 50 to generate an input signal $VB_{LNA1}$. The initial signal $V_{AIR}$ may comprise multiple types of signals such as the first-type signal (e.g. the WLAN signal) and the second type signal (e.g. the Bluetooth signal). Thus, the input signal $VA_{LNA1}$ may comprise amplified results of the first-type signal and the second-type signal (which may be referred to as the WLAN signal and the Bluetooth signal among the input signal $VA_{LNA1}$) generated by the pre-stage LNA 110A, and the input signal $VB_{LNA1}$ may comprise amplified results of the first-type signal and the second-type signal (which may be referred to as the WLAN signal and the Bluetooth signal among the input signal $VB_{LNA1}$) generated by the pre-stage LNA 110B. The Balun transformer 120A is coupled to the pre-stage LNA 110A, and may be configured to perform a conversion operation (e.g. the single-to-differential conversion) upon the input signal $VA_{LNA1}$ to generate a converted signal $VAd_{LNA1}$. The Balun transformer 120B is coupled to the pre-stage LNA 110B, and may be configured to perform the conversion operation (e.g. the single-to-differential conversion) upon the input signal $VB_{LNA1}$ to generate a converted signal $VBd_{LNA1}$. The N-path filter 100A is coupled to the Balun transformer 120A, and is configured to filter (e.g. performing band pass filtering) the converted signal $VAd_{LNA1}$. The N-path filter 100B is coupled to the Balun transformer 120B, and is configured to filter (e.g. performing band pass filtering) the converted signal $VBd_{LNA1}$.

In this embodiment, either of the N-path filters 100A and 100B may be an example of the N-path filter 100 shown in FIG. 1. In particular, mixers MA3 and MA4 and a capacitor $C_{WL,Npath}$ within the N-path filter 100A may be examples of the mixers M3 and M4 and the capacitor $C_{Npath}$ within the N-path filter 100, where a frequency $LO_{WL}$. $N_{path}$ may be an example of the frequency $LO_{Npath}$. In addition, mixers MB3 and MB4 and a capacitor $C_{BT,Npath}$ within the N-path filter 100B may be examples of the mixers M3 and M4 and the capacitor $C_{Npath}$ within the N-path filter 100, where a frequency $LO_{BT,Npath}$ may be an example of the frequency $LO_{Npath}$. Thus, the N-path filter 100A may achieve a band pass filtering effect with a center frequency equal to the frequency $LO_{WL,Npath}$ on the converted signal $VAd_{LNA1}$, and the N-path filter 100B may achieve a band pass filtering effect with a center frequency equal to the frequency $LO_{BT,Npath}$ on the converted signal $VBd_{LNA1}$. In this embodiment, the WLAN signal is carried on the frequency $LO_{WL}$ and the Bluetooth signal is carried on the frequency $LO_{BT}$. Thus, when the frequency $LO_{WL,Npath}$ is set to be $LO_{WL}$ and the frequency $LO_{BT,Npath}$ is set to be $LO_{BT}$, the N-path filter 100A may reduce powers of signals other than the WLAN signal among the converted signal $VAd_{LNA1}$, and the N-path filter 100B may reduce powers of signals other than the Bluetooth signal among the converted signal $VBd_{LNA1}$.

In this embodiment, the post-stage LNA 130A, the AC-coupled capacitors CA1 and CA2, the down converter 140A, the amplifier 150A, the low pass filter 160A, the ADC 170A and the digital circuit 180A may form a WLAN receiving path coupled to the Balun transformer 120A and the N-path filter 100A, in order to process the WLAN signal among the converted signal $VAd_{LNA1}$. In addition, the post-stage LNA 130B, the AC-coupled capacitors CB1 and CB2, the down converter 140B, the amplifier 150B, the low pass filter 160B, the ADC 170B and the digital circuit 180B may form a Bluetooth receiving path coupled to the Balun transformer 120B and the N-path filter 100B, in order to process the Bluetooth signal among the converted signal $VBd_{LNA1}$. As operations of the WLAN receiving path and the Bluetooth receiving path of the wireless communication device 40 mentioned above are the same as the WLAN receiving path and the Bluetooth receiving path of the wireless communication device 10 shown in FIG. 1, related details are omitted here for brevity.

Based on the above description, under the architecture of the wireless communication device 40, the N-path filter 100A may reduce the powers of signals other than the WLAN signal among the converted signal $VAd_{LNA1}$ received by the WLAN receiving path (e.g. the post-stage LNA 130A) without affecting the Bluetooth signal among the converted signal $VBd_{LNA1}$ received by the Bluetooth receiving path (e.g. the post-stage LNA 130B). Similarly, the N-path filter 100B may reduce the powers of signals other than the Bluetooth signal among the converted signal $VBd_{LNA1}$ received by the Bluetooth receiving path (e.g. the post-stage LNA 130B) without affecting the WLAN signal among the converted signal $VAd_{LNA1}$ received by the WLAN receiving path (e.g. the post-stage LNA 130A).

Figure 5:
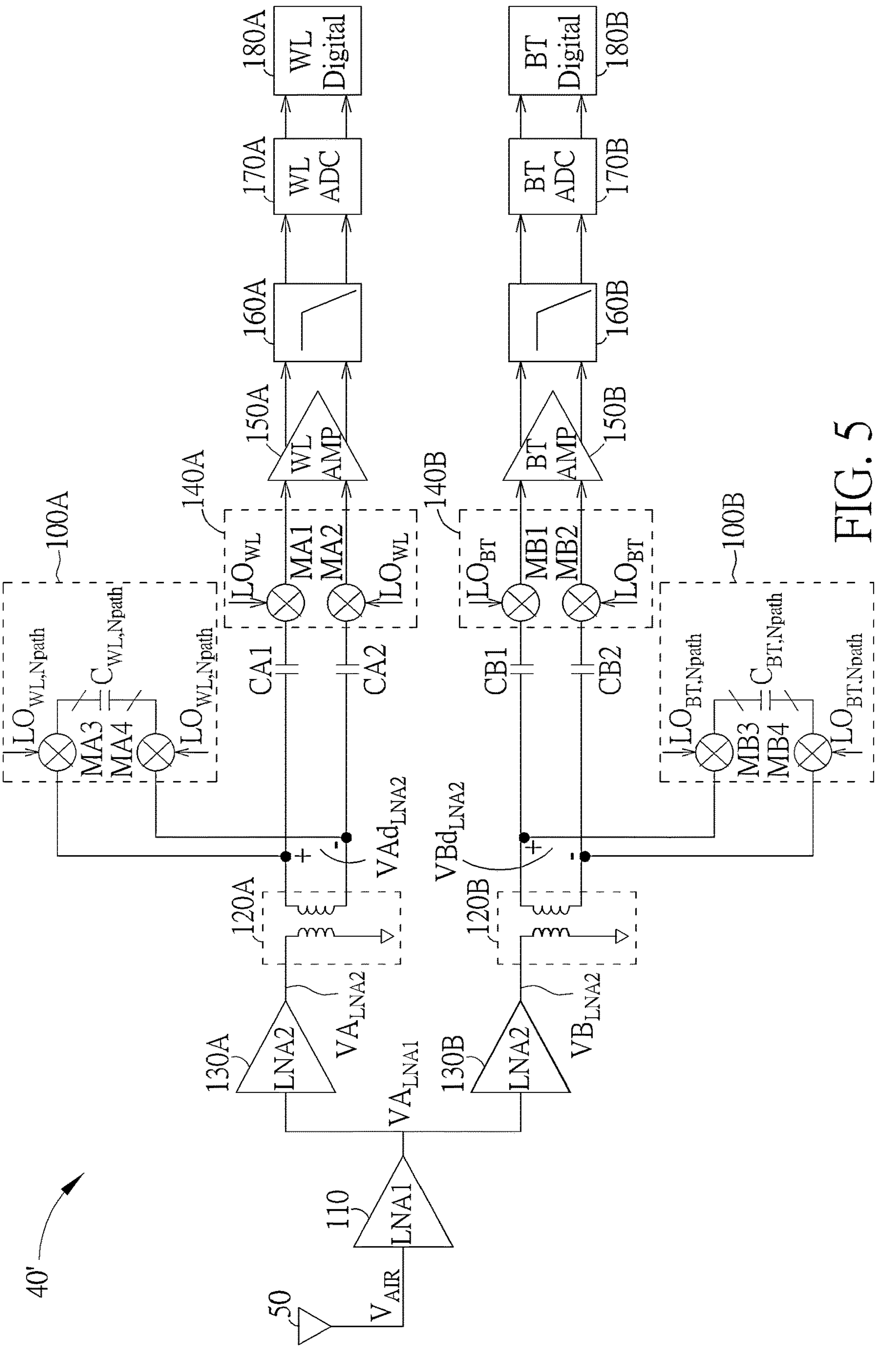
FIG. 5 is a diagram illustrating a wireless communication device according to another embodiment of the present invention.

FIG. 5 is a diagram illustrating a wireless communication device 40' according to another embodiment of the present invention, where the communication device 40' may be a receiver which is equipped with a function of concurrently receiving multiple types of signals such as the Bluetooth signals and the WLAN signals. In some embodiment, the wireless communication device 40' may be a portion of a transceiver (e.g. a receiver within the transceiver) which is equipped with the function of concurrently receiving the multiple types of signals (e.g. the Bluetooth signals and the WLAN signals), but the present invention is not limited thereto. As shown in FIG. 5, the wireless communication device 40' may comprise the antenna 50, the pre-stage LNA 110, the post-stage LNAs 130A and 130B, the Balun transformers 120A and 120B, and filters such as N-path filters 100A and 100B, where connections and operations of the other components within the wireless communication device 40' shown in FIG. 5 are the same as the wireless communication device 40 shown in FIG. 4, and will not be repeated here for brevity.

In comparison with the wireless communication device 40 shown in FIG. 4, the WLAN receiving path and the Bluetooth receiving path of the wireless communication device 40 of this embodiment share one pre-stage LNA such as the pre-stage LNA 110, and operations of the post-stage LNAs 130A and 130B are prior to the single-to-differential conversion. In particular, the post-stage LNA 130A is coupled between the pre-stage LNA 110 and the Balun transformer 120A, and the post-stage LNA 130B is coupled between the pre-stage LNA 110 and the Balun transformer 120B. As shown in FIG. 5, the pre-stage LNA 110 may amplify the initial signal $V_{AIR}$ received by the antenna 50 to generate the input signal $V_{LNA1}$. The post-stage LNA 130A may amplify the input signal $V_{LNA1}$ (e.g. amplifying the input signal $V_{LNA1}$ according to requirements of receiving the WLAN signal) to further generate an input signal $VA_{LNA2}$, and the Balun transformer 120A may perform a conversion operation (e.g. the single-to-differential conversion) upon the input signal $VA_{LNA2}$ to generate a converted signal $VAd_{LNA2}$. The post-stage LNA 130B may amplify the input signal $V_{LNA1}$ (e.g. amplifying the input signal $V_{LNA1}$ according to requirements of receiving the Bluetooth signal) to further generate an input signal $VB_{LNA2}$, and the Balun transformer 120B may perform the conversion operation (e.g. the single-to-differential conversion) upon the input signal $VB_{LNA2}$ to generate a converted signal $VBd_{LNA2}$. Under this architecture, the converted signal $VAd_{LNA2}$ output from the Balun transformer 120A may be transmitted to the AC-coupled capacitors CA1 and CA2 for subsequent processing, and the converted signal $VBd_{LNA2}$ output from the Balun transformer 120B may be transmitted to the AC-coupled capacitors CB1 and CB2 for subsequent processing. Apart from the above differences, the remaining operations are similar to those in the embodiment of FIG. 4, and will not be repeated here for brevity.

Figure 6:
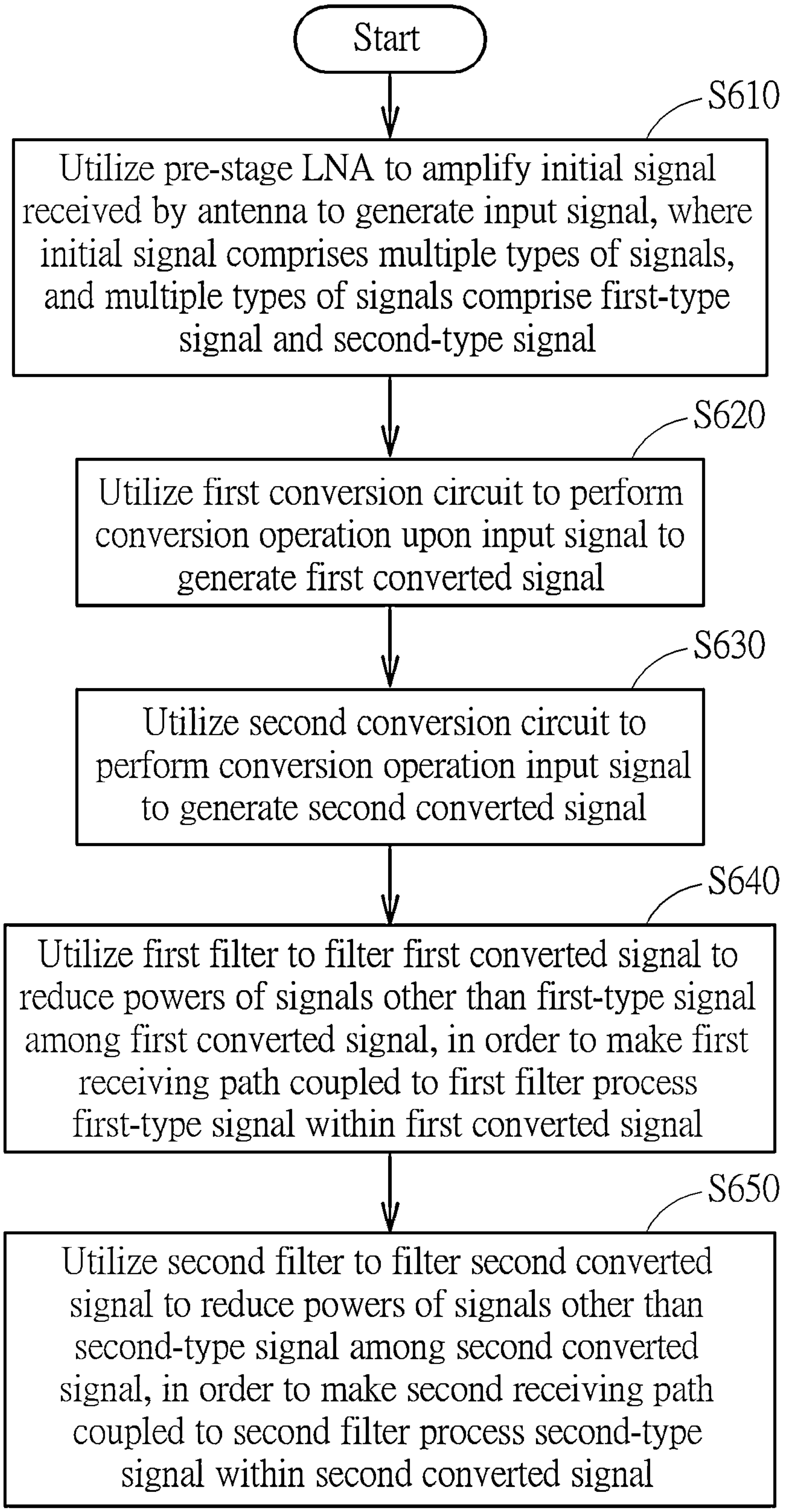
FIG. 6 is a diagram illustrating a working flow of a method for concurrently receiving multiple types of signals in a wireless communication device according to another embodiment of the present invention.

FIG. 6 is a diagram illustrating a working flow of a method for concurrently receiving multiple types of signals (e.g. the WLAN signal and the Bluetooth signal mentioned above) in a wireless communication device (e.g. the wireless communication device 40 shown in FIG. 4 or the wireless communication device 40' shown in FIG. 5) according to another embodiment of the present invention. It should be noted that the working flow shown in FIG. 6 is for illustrative purposes only, and is not meant to be a limitation of the present invention. For example, one or more steps may be added, deleted or modified in the working flow shown in FIG. 6. In addition, if a same result can be obtained, these steps do not have to be executed in the exact order shown in FIG. 6.

In Step S610, the communication device may utilize at least one pre-stage LNA therein to amplify an initial signal received by an antenna to generate at least one input signal, where the initial signal comprises the multiple types of signals, and the multiple types of signals comprise a first-type signal (e.g. the WLAN signal) and a second-type signal (e.g. the Bluetooth signal).

In Step S620, the wireless communication device may utilize a first conversion circuit therein to perform a conversion operation upon the at least one input signal to generate a first converted signal.

In Step S630, the wireless communication device may utilize a second conversion circuit therein to perform the conversion operation upon the at least one input signal to generate a second converted signal.

In Step S640, the wireless communication device may utilize a first filter therein to filter the first converted signal to reduce powers of signals other than the first-type signal among the first converted signal, in order to make a first receiving path coupled to the first filter process the first-type signal within the first converted signal.

In Step S650, the wireless communication device may utilize a second filter therein to filter the second converted signal to reduce powers of signals other than the second-type signal among the second converted signal, in order to make a second receiving path coupled to the second filter process the second-type signal within the second converted signal.

To summarize, the wireless communication device and the associated method provided by the embodiment of the present invention can determine configurations of the N-path filter (e.g. turning on or off the N-path filter) according to respective enablement states of functions of receiving respective types of signals, to prevent the received WLAN signal or Bluetooth signal from being filtered out. In addition, the present invention can utilize separated paths to respectively process the WLAN signal and the Bluetooth signal after the signals undergoes the single-to-differential conversion. Thus, signal qualities of the WLAN signal and the Bluetooth signal can be improved with the aid of corresponding configurations of the N-path filters without interfering with each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device for concurrently receiving multiple types of signals, comprising:

at least one pre-stage low noise amplifier (LNA), coupled to an antenna, configured to amplify an initial signal received by the antenna to generate at least one input signal, wherein the initial signal comprises the multiple types of signals, and the multiple types of signals comprise a first-type signal and a second-type signal;

a first conversion circuit, configured to perform a conversion operation upon the at least one input signal to generate a first converted signal;

a second conversion circuit, configured to perform the conversion operation upon the at least one input signal to generate a second converted signal;

a first filter, coupled to the first conversion circuit, configured to filter the first converted signal to reduce powers of signals other than the first-type signal among the first converted signal, in order to make a first receiving path coupled to the first filter process the first-type signal within the first converted signal; and a second filter, coupled to the second conversion circuit, configured to filter the second converted signal to reduce powers of signals other than the second-type signal among the second converted signal, in order to make a second receiving path coupled to the second filter process the second-type signal within the second converted signal.

2. The wireless communication device of claim 1, wherein the conversion operation is a single-to-differential signal conversion.

3. The wireless communication device of claim 1, wherein the first filter and the second filter are a first N-path filter and a second N-path filter, respectively.

4. The wireless communication device of claim 3, wherein the first N-path filter is configured to perform band pass filtering upon the first converted signal with a center frequency equal to a first frequency, and the second N-path filter is configured to perform band pass filtering upon the second converted signal with a center frequency equal to a second frequency.

5. The wireless communication device of claim 4, wherein each of the first N-path filter and the second N-path filter comprises:

at least one mixer; and a capacitor, coupled to the at least one mixer;

wherein the at least one mixer within the first N-path filter drives the capacitor within the first N-path filter, and the at least one mixer within the second N-path filter drives the capacitor within the second N-path filter.

6. The wireless communication device of claim 5, wherein the at least one mixer comprises a first mixer and a second mixer, and the capacitor is coupled between the first mixer and the second mixer.

7. The wireless communication device of claim 1, wherein the at least one pre-stage LNA comprises:

a first pre-stage LNA, coupled between the antenna and the first conversion circuit, configured to amplify the initial signal to generate a first input signal of the at least one input signal, to make the first conversion circuit perform the conversion operation upon the first input signal in order to generate the first converted signal; and a second pre-stage LNA, coupled between the antenna and the second conversion circuit, configured to amplify the initial signal to generate a second input signal of the at least one input signal, to make the second conversion circuit perform the conversion operation upon the second input signal in order to generate the second converted signal.

8. The wireless communication device of claim 1, further comprising:

a first post-stage LNA, coupled between the at least one pre-stage LNA and the first conversion circuit, configured to amplify the at least one input signal to generate a first input signal, to make the first conversion circuit perform the conversion operation upon the first input signal in order to generate the first converted signal; and a second post-stage LNA, coupled between the at least one pre-stage LNA and the second conversion circuit, configured to amplify the at least one input signal to generate a second input signal, to make the second conversion circuit perform the conversion operation upon the second input signal in order to generate the second converted signal.

9. A method for concurrently receiving multiple types of signals in a wireless communication device, comprising:

utilizing at least one pre-stage low noise amplifier (LNA) of the wireless communication device to amplify an initial signal received by an antenna to generate at least one input signal, wherein the initial signal comprises the multiple types of signals, and the multiple types of signals comprise a first-type signal and a second-type signal;

utilizing a first conversion circuit of the wireless communication device to perform a conversion operation upon the at least one input signal to generate a first converted signal;

utilizing a second conversion circuit of the wireless communication device to perform the conversion operation upon the at least one input signal to generate a second converted signal;

utilizing a first filter of the wireless communication device to filter the first converted signal to reduce powers of signals other than the first-type signal among the first converted signal, in order to make a first receiving path coupled to the first filter process the first-type signal within the first converted signal; and utilizing a second filter of the wireless communication device to filter the second converted signal to reduce powers of signals other than the second-type signal among the second converted signal, in order to make a second receiving path coupled to the second filter process the second-type signal within the second converted signal.

10. The method of claim 9, wherein the conversion operation is a single-to-differential signal conversion.

11. The method of claim 9, wherein the first filter and the second filter are a first N-path filter and a second N-path filter, respectively.

12. The method of claim 11, wherein the first N-path filter is configured to perform band pass filtering upon the first converted signal with a center frequency equal to a first frequency, and the second N-path filter is configured to perform band pass filtering upon the second converted signal with a center frequency equal to a second frequency.

13. The method of claim 12, wherein each of the first N-path filter and the second N-path filter comprises:

at least one mixer; and a capacitor, coupled to the at least one mixer;

wherein the at least one mixer within the first N-path filter drives the capacitor within the first N-path filter, and the at least one mixer within the second N-path filter drives the capacitor within the second N-path filter.

14. The method of claim 13, wherein the at least one mixer comprises a first mixer and a second mixer, and the capacitor is coupled between the first mixer and the second mixer.

15. The method of claim 9, wherein utilizing the at least one pre-stage LNA of the wireless communication device to amplify the initial signal received by the antenna to generate the at least one input signal comprises:

utilizing a first pre-stage LNA of the at least one pre-stage LNA to amplify the initial signal to generate a first input signal of the at least one input signal, to make the first conversion circuit perform the conversion operation upon the first input signal in order to generate the first converted signal; and utilizing a second pre-stage LNA of the at least one pre-stage LNA to amplify the initial signal to generate a second input signal of the at least one input signal, to make the second conversion circuit perform the conversion operation upon the second input signal in order to generate the second converted signal.

16. The method of claim 9, further comprising:

utilizing a first post-stage LNA of the wireless communication device to amplify the at least one input signal to generate a first input signal, to make the first conversion circuit perform the conversion operation upon the first input signal in order to generate the first converted signal; and utilizing a second post-stage LNA of the wireless communication device to amplify the at least one input signal to generate a second input signal, to make the second conversion circuit perform the conversion operation upon the second input signal in order to generate the second converted signal.

17. A method for concurrently receiving multiple types of signals in a wireless communication device, comprising:

utilizing a pre-stage low noise amplifier (LNA) of the wireless communication device to amplify an initial signal received by an antenna to generate an input signal, wherein the initial signal comprises the multiple types of signals, and the multiple types of signals comprise a first-type signal and a second-type signal;

utilizing a conversion circuit of the wireless communication device to perform a conversion operation upon the input signal to generate a converted signal; and controlling a configuration of a filter coupled to the conversion circuit according to an enablement state of a function of receiving the first-type signal or the second-type signal, wherein the filter is configured to filter the converted signal to reduce powers of signals other than either of the first-type signal and the second-type signal among the converted signal.

* * * * *